(12) United States Patent
Lee et al.

(10) Patent No.: US 10,157,191 B2
(45) Date of Patent: Dec. 18, 2018

(54) METADATA TAGGING SYSTEM, IMAGE SEARCHING METHOD AND DEVICE, AND METHOD FOR TAGGING A GESTURE THEREOF

(75) Inventors: Keum-koo Lee, Gyeonggi-do (KR); Ji-young Kwahk, Gyeonggi-do (KR); Seung-dong Yu, Gyeonggi-do (KR); Hyun-joo Oh, Seoul (KR); Yeon-hee Roh, Seoul (KR); Joon-hwan Kim, Gyeonggi-do (KR); Soung-min Yoo, Gyeonggi-do (KR); Min-jung Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 387 days.

(21) Appl. No.: 12/860,509

(22) Filed: Aug. 20, 2010
(Under 37 CFR 1.47)

(65) Prior Publication Data
US 2011/0047517 A1 Feb. 24, 2011

(30) Foreign Application Priority Data

Aug. 21, 2009 (KR) .................. 10-2009-0077507
Feb. 8, 2010 (KR) .................. 10-2010-0011496

(51) Int. Cl.
*G06F 3/033* (2013.01)
*G06F 17/30* (2006.01)
*G06F 3/0488* (2013.01)

(52) U.S. Cl.
CPC .... *G06F 17/30265* (2013.01); *G06F 3/04883* (2013.01)

(58) Field of Classification Search
CPC .................. G06F 3/04883; G06F 3/017; G06F 2203/04808; G06F 3/0482; G06F 2203/0381; G06T 11/60
See application file for complete search history.

(56) References Cited

U.S. PATENT DOCUMENTS

| 5,832,474 A | 11/1998 | Lopresti et al. |
| 2001/0039546 A1 | 11/2001 | Moore et al. |
| 2004/0001093 A1 | 1/2004 | Sellers et al. |

(Continued)

FOREIGN PATENT DOCUMENTS

| CN | 1443326 | 9/2003 |
| CN | 101211371 | 7/2008 |

(Continued)

OTHER PUBLICATIONS

Australian Examination Report dated Nov. 20, 2014 issued in counterpart application No. 2010284736.

(Continued)

*Primary Examiner* — Jeffrey A Gaffin
*Assistant Examiner* — Ayesha Huertas Torres
(74) *Attorney, Agent, or Firm* — The Farrell Law Firm, P.C.

(57) ABSTRACT

A metadata tagging system, an image searching method, a device, and a gesture tagging method are provided. The metadata tagging system includes a first device which tags metadata to an image and transmits the image tagged with the metadata and a second device which allows at least one image from among stored images to be searched. Accordingly, generated data may be searched and used more easily and conveniently.

6 Claims, 27 Drawing Sheets

(56) References Cited

U.S. PATENT DOCUMENTS

| | | | |
|---|---|---|---|
| 2005/0050043 A1* | 3/2005 | Pyhalammi et al. | 707/6 |
| 2007/0005571 A1 | 1/2007 | Brewer et al. | |
| 2007/0294294 A1* | 12/2007 | Aarnio | G06F 17/30265 |
| 2008/0162450 A1 | 7/2008 | McIntyre et al. | |
| 2008/0189270 A1 | 8/2008 | Takimoto et al. | |
| 2008/0235275 A1 | 9/2008 | Tanaka et al. | |
| 2009/0005088 A1 | 1/2009 | Hsu | |
| 2009/0119572 A1* | 5/2009 | Koivunen | 715/206 |
| 2009/0153492 A1 | 6/2009 | Popp | |
| 2009/0222770 A1* | 9/2009 | Chang | 715/863 |
| 2010/0127991 A1* | 5/2010 | Yee | G06K 9/00422 345/173 |
| 2010/0274774 A1* | 10/2010 | Son et al. | 707/706 |
| 2011/0034208 A1* | 2/2011 | Gu et al. | 455/550.1 |
| 2012/0023103 A1* | 1/2012 | Soderberg et al. | 707/739 |
| 2012/0139857 A1* | 6/2012 | Terebkov et al. | 345/173 |

FOREIGN PATENT DOCUMENTS

| | | |
|---|---|---|
| CN | 101410825 | 4/2009 |
| CN | 101470755 | 7/2009 |
| EP | 1 513 080 | 3/2005 |
| JP | 10-055371 | 2/1998 |
| JP | 2000-090113 | 3/2000 |
| JP | 1020000137555 | 5/2000 |
| JP | 1020030233452 | 8/2003 |
| JP | 1020060331210 | 12/2006 |
| JP | 2008-257471 | 10/2008 |
| JP | 2009-017017 | 1/2009 |
| JP | 2009-093433 | 4/2009 |
| KR | 1020090013037 | 2/2009 |
| KR | 1020090024416 | 3/2009 |
| WO | WO 2007/098295 | 8/2007 |
| WO | WO 2007/098296 | 8/2007 |
| WO | WO 2009/075427 | 6/2009 |
| WO | WO 2010/059329 | 5/2010 |

OTHER PUBLICATIONS

Japanese Office Action dated Dec. 16, 2014 issued in counterpart application No, 2012-525501.
Australian Examination Report dated Apr. 2, 2015 issued in counterpart application No. 2010284736.
Australian Examination Report dated Aug. 3, 2015 issued in counterpart application No. 2010284736, 3 pages.
Australian Examination Report dated Nov. 24, 2015 issued in counterpart application No. 2010284736, 3 pages.
Notice of Acceptance dated Jan. 19, 2016 issued in counterpart application No. 2010284736, 3 pages.
Korean Office Action dated Jan. 28, 2016 issued in counterpart application No. 10-2010-0011496, 16 pages.
European Search Report dated Aug. 19, 2016 issued in counterpart application No. 10810215.3-1951, 9 pages.
Chinese Office Action dated Aug. 22, 2016 issued in counterpart application No. 201410293697.6, 13 pages.
Chinese Office Action dated Feb. 27, 2017 issued in counterpart application No. 201410293697.6, 14 pages.
Chinese Office Action dated Jul. 20, 2017 issued in counterpart application No. 201410293697.6, 15 pages.
European Search Report dated Aug. 3, 2017 issued in counterpart application No. 10810215.3-1871, 5 pages.
CN Notification of Reexamination dated Jul. 25, 2018 issued in counterpart application No. 201410293697.6, 16 pages.
EP Summons to Attend Oral Proceedings dated Jul. 27, 2018 issued in counterpart application No. 10810215.3-1217, 8 pages.

* cited by examiner

200

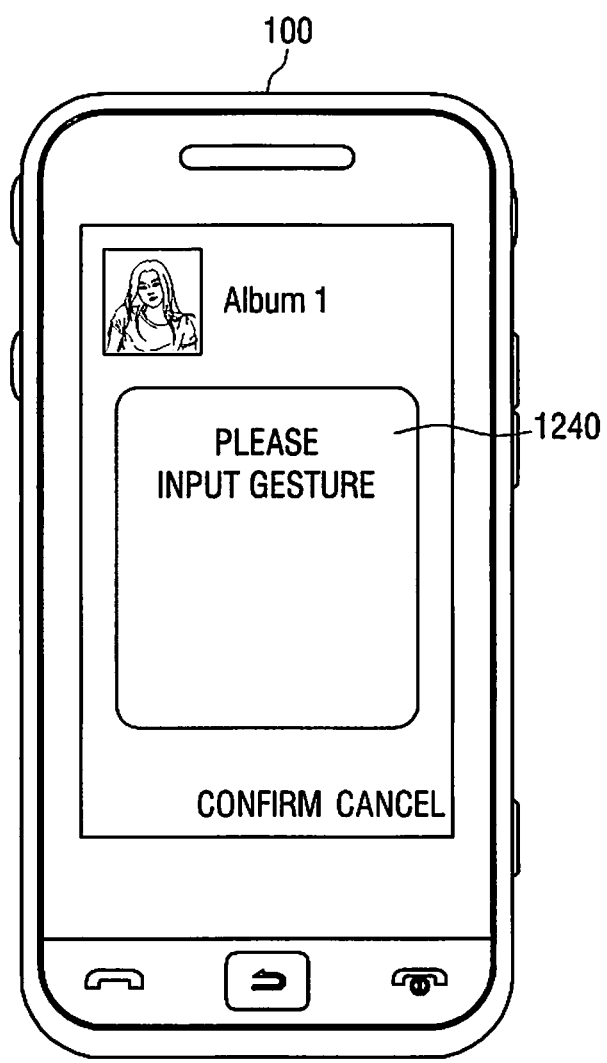

… (1)

METADATA TAGGING SYSTEM, IMAGE SEARCHING METHOD AND DEVICE, AND METHOD FOR TAGGING A GESTURE THEREOF

PRIORITY

This application claims priority to Korean Patent Application Nos. 2009-77507 and 2010-11496, filed in the Korean Intellectual Property Office on Aug. 21, 2009 and Feb. 8, 2010, respectively, the disclosures of which are incorporated herein by reference.

BACKGROUND OF THE INVENTION

1. Field of the Invention

The present invention generally relates to a metadata tagging system, an image searching method and device, and a method for tagging a gesture thereof, and more particularly, to a metadata tagging system for searching an image based on tagged metadata, an image searching method and device, and a method for tagging a gesture thereof.

2. Description of the Prior Art

In general, a user searches data by inputting a keyword related to the data or selecting a keyword from among the keywords provided by a system. In order to do so, metadata indicating data contents should be registered in association with a database which is prepared in advance.

However, a user should update this registration of associating metadata with the database frequently in order to search data smoothly, and this may cause inconvenience to the user. That is, if metadata is not properly associated with the database through registration, the user may not be able to search desired data effectively from among vast amounts of data.

Accordingly, a method for extracting metadata automatically without inputting registration of an association by a user so as to allow the user to search data effectively based on the extracted metadata is required.

SUMMARY OF THE INVENTION

Aspects of the embodiments of the present invention relate to a metadata tagging system to search data easily and conveniently, an image searching method and device, and a method for tagging gesture thereof.

A metadata tagging system, according to an embodiment of the present invention, includes a first device which analyzes an image, extracts at least one metadata regarding the image, tags the metadata to the image, and transmits the image tagged with the metadata to a third device, and a second device which allows at least one image from among images stored in the third device to be searched based on the metadata.

The first device analyzes an image using at least one of a face recognition algorithm, a configuration analysis algorithm, and a color analysis algorithm, and extracts metadata regarding at least one of figure, place, and object included in the image.

The second device selects at least one text from among texts displayed on the second device and transmits the selected text to the third device so that at least one image from among images stored in the third device is searched based on the selected text.

The third device searches an image based on metadata tagged to images stored in the third device, and transmits the searched image to the second device.

An image searching method, according to an embodiment of the present invention, includes extracting at least one metadata regarding the image through image analysis, tagging the metadata to the image and storing the image with tagged metadata in an external device, and searching at least one image from among images stored in the external device based on the metadata.

A device, according to an embodiment of the present invention, includes a manipulation unit which receives an input of a user's gesture and a controller which tags the input gesture to metadata of specific contents.

A gesture tagging method, according to an embodiment of the present invention, includes receiving an input of a user's gesture and tagging the received user's gesture to metadata of specific contents.

The gesture tagging method furthers include executing the specific contents if the gesture is input through the manipulation unit while the gesture is tagged to metadata of the specific contents.

As described above, generated data is analyzed and metadata is tagged and stored. Accordingly, data may be searched and used more easily and conveniently. In addition, as a gesture is also tagged to metadata, a user may search desired contents using the gesture.

BRIEF DESCRIPTION OF THE DRAWINGS

The above and/or other aspects of the present disclosure will be more apparent by describing embodiments of the present invention with reference to the accompanying drawings, in which:

FIGS. 12A to 12E illustrate a process of changing a gesture tagged to metadata of music contents using a mobile phone.

DETAILED DESCRIPTION OF EMBODIMENTS OF THE PRESENT INVENTION

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

Configuration and Operation Flow of Metadata Tagging System

Figure 1:
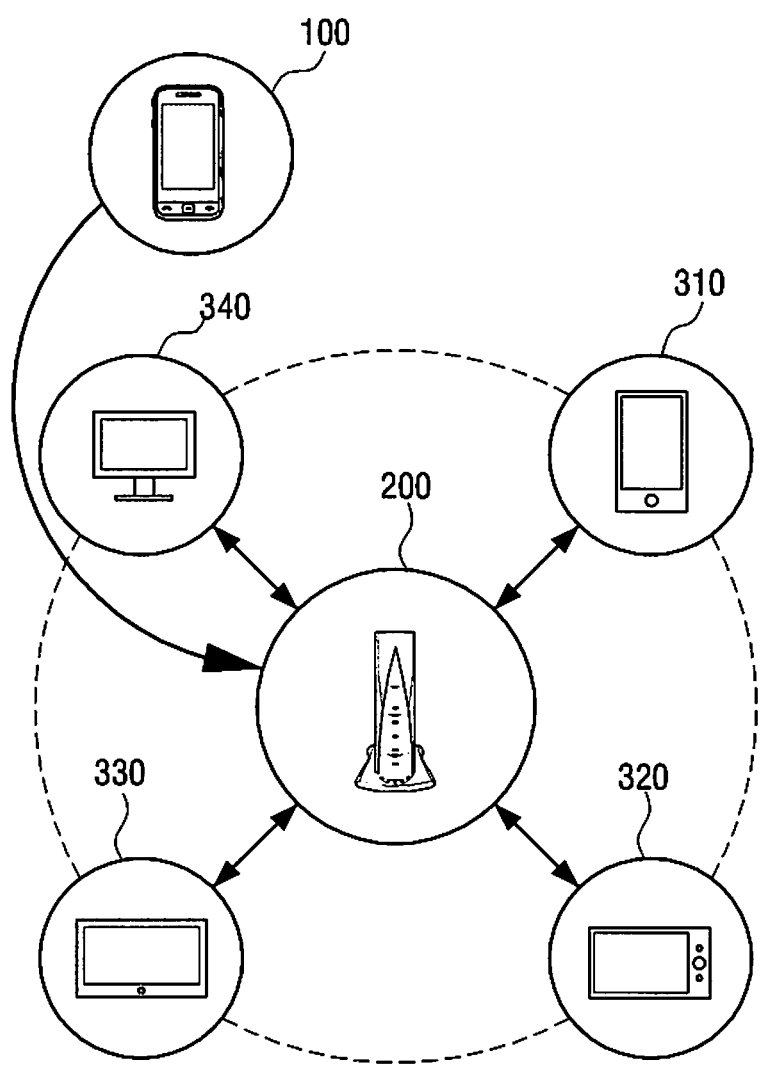
FIG. 1 illustrates a metadata tagging system according to an embodiment of the present invention.

FIG. 1 is a metadata tagging system according to an embodiment of the present invention. The metadata tagging system extracts metadata of a photographed image and stores the photographed image after tagging the extracted metadata to the photographed image so as to make it easier for a user to search photographed images.

The metadata tagging system comprises a mobile phone 100, a central storage apparatus 200, and peripheral apparatuses 310, 320, 330, 340.

The mobile phone 100 may be used not only to have telephonic communication with another communication subscriber but also to photograph a subject and store the photographed image in the central storage apparatus 200, which will be explained below.

The mobile phone 100 photographs a subject using a built-in camera, extracts information on image properties, that is, metadata of the image by analyzing the image of the photographed subject and transmits the image to the central storage apparatus 200 after tagging the extracted metadata to the image so that the tagged image can be stored in the central storage apparatus 200. The method for tagging metadata to an image will be explained below.

In general, the central storage apparatus 200 is a fixed storage apparatus which stores images received from the mobile phone 100 and transmits images which are called out in response to a command from one of the peripheral apparatuses 310, 320, 330, 340 to one of the peripheral apparatuses 310, 320, 330, 340.

Of course, the central storage apparatus 200 may store images generated not only by the mobile phone 100 but also by the peripheral apparatus 310, and may transmit images not only to the peripheral apparatuses 310, 320, 330, 340 but also to the mobile phone 100.

The peripheral apparatuses 310, 320, 330, 340 include all apparatuses which are portable, and examples of the peripheral apparatuses 310, 320, 330, 340, include an MP3P 310, a digital camera 320, a TV 330, and a monitor 340.

The peripheral apparatuses 310, 320, 330, 340 may also access the central storage apparatus 200 and receive images stored in the central storage apparatus 200. In particular, the peripheral apparatuses 310, 320, 330, 340 may receive a part of images stored in the central storage apparatus 200 and may select various searching methods to select the part of stored images. The searching methods will be explained below.

Figure 2:
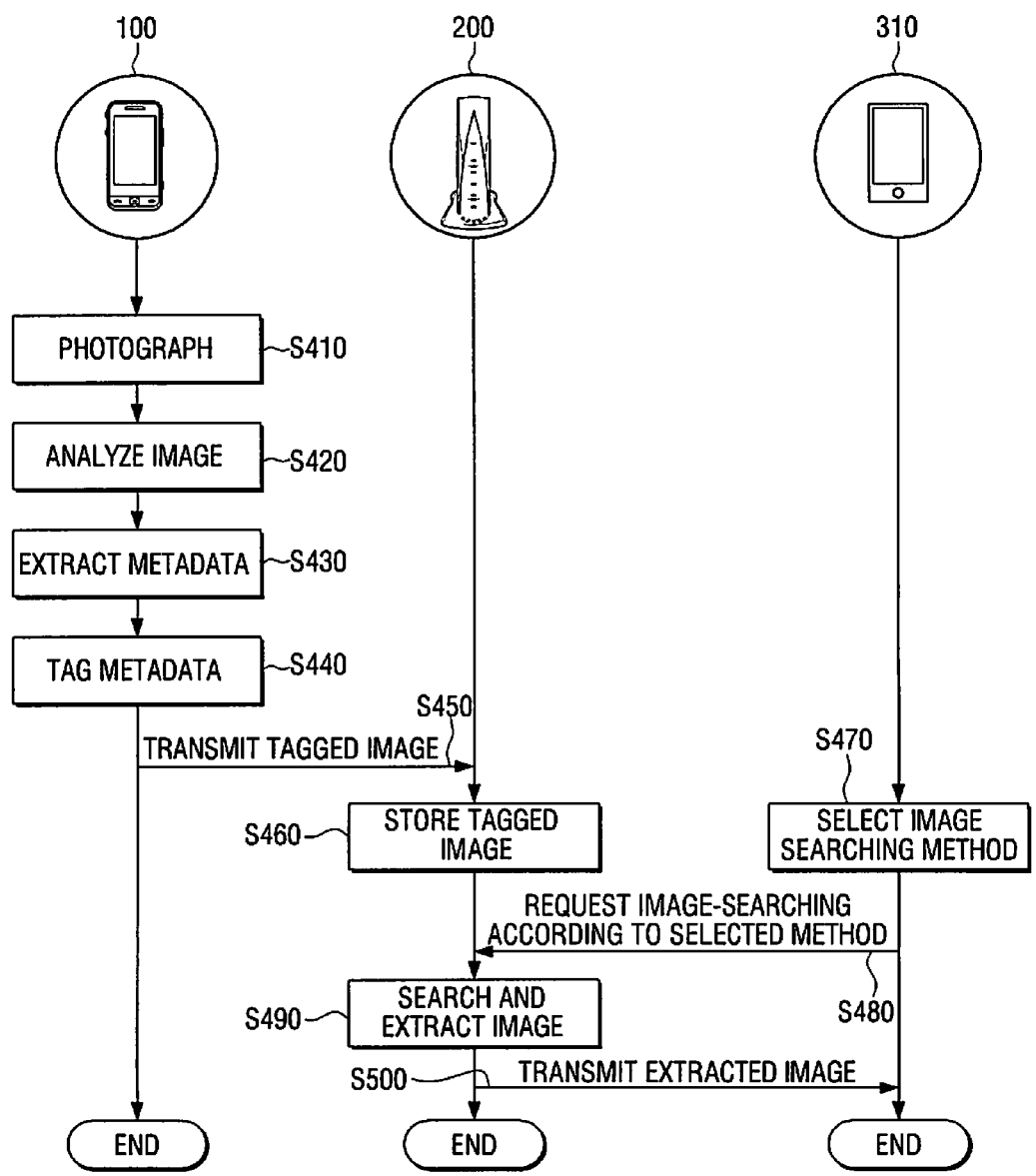
FIG. 2 illustrates a method for tagging metadata according to an embodiment of the present invention.

FIG. 2 illustrates a method for tagging metadata according to an embodiment of the present invention. Hereinafter, the MP3P 310 will be referred to as an apparatus representing peripheral apparatuses for convenience of explanation.

If the mobile phone 100 photographs a subject and generates an image in step S410, the mobile phone 100 analyzes the generated image in step S420 and extracts metadata regarding the image in step S430.

Metadata may be extracted using the methods below.

First, metadata may be extracted by analyzing a generated image. Images may be analyzed using a face recognition algorithm, a configuration analysis algorithm, etc. Using such algorithms, the mobile phone 100 may extract information regarding a man, an animal, a place, surrounding subjects or movement of the man or animal in a generated image.

For example, the mobile phone 100 may identify a face in a generated image and obtain information regarding a figure by analyzing a specific outline of the face and locations of ear, eye, mouth, and nose in the face. In addition, the mobile phone 100 may also obtain information regarding a place based on a landmark, a milestone or a signboard included in the generated image.

Second, metadata may be extracted based on information related to the date/time when an image is generated. Information on date/time which is stored in the mobile phone 100 automatically when a subject is photographed may be used.

For example, if the subject is photographed on May 1, 2009, this data is stored in the mobile phone 100, and based on the stored data, the mobile phone 100 may extract metadata.

Third, metadata may be extracted based on information regarding a location where an image is generated using a GPS signal receiver. The GPS signal receiver identifies a specific location of a subject when the subject is photographed and transmits the information to the mobile phone 100, and the mobile phone 100 may extract metadata based on the transmitted information.

Fourth, metadata may be extracted based on information directly input by a user. That is, if the user photographs a subject and inputs information regarding the photographed image, the mobile phone 100 may extract metadata based on the input information.

Meanwhile, the mobile phone 100 tags extracted metadata to an image in step S440. If there is a plurality of metadata, the mobile phone 100 tags the plurality of metadata to the image.

If a plurality of metadata is extracted, the mobile phone 100 may select a part of metadata from among the plurality of metadata and tag the selected metadata to the image. Herein, the mobile phone 100 may select metadata according to a user's usage pattern or a priority set by the user.

Herein, the user's usage pattern refers to the user's pattern of using metadata to search an image. Specifically, the mobile phone 100 may select most frequently used metadata and tag the metadata to an image. For example, if the most frequently used metadata is metadata regarding face recognition, the mobile phone 100 may select only the metadata regarding face recognition from among extracted metadata and tag the selected metadata to the image.

The priority set by a user refers to a priority which the user has set for each metadata. The mobile phone 100 selects metadata with highest priority and tags the selected metadata to the image. For example, if the user sets metadata extracted through face recognition as a first priority, the mobile phone 100 selects the metadata extracted through face recognition from among various metadata and tags the selected metadata to the image.

As such, if a plurality of metadata is extracted, the mobile phone 100 may select a part of the plurality of metadata and tag the selected metadata to the image.

If metadata is tagged to the image, the mobile phone 100 transmits the tagged image to the central storage apparatus 200 in step S450.

The central storage apparatus 200 stores the image tagged with metadata in step S460.

Meanwhile, the MP3P 310 receives an image searching method from a user to selectively receive a desired image from among the images tagged and stored in the central storage apparatus 200 in step S470.

If a user selects an image searching method, the MP3P 310 requests the central storage apparatus 200 to search an image according to the selected method in step S480, and the central storage apparatus 200 searches and extracts an image according to the requested searching method in step S490 and transmits the extracted images to the MP3P 310 in step S500.

As such, the mobile phone 100 analyzes a photographed image and tags metadata, and thus the MP3P 310 may use the photographed image by searching the photographed image from the mobile phone 100 more easily and conveniently.

Figure 3:
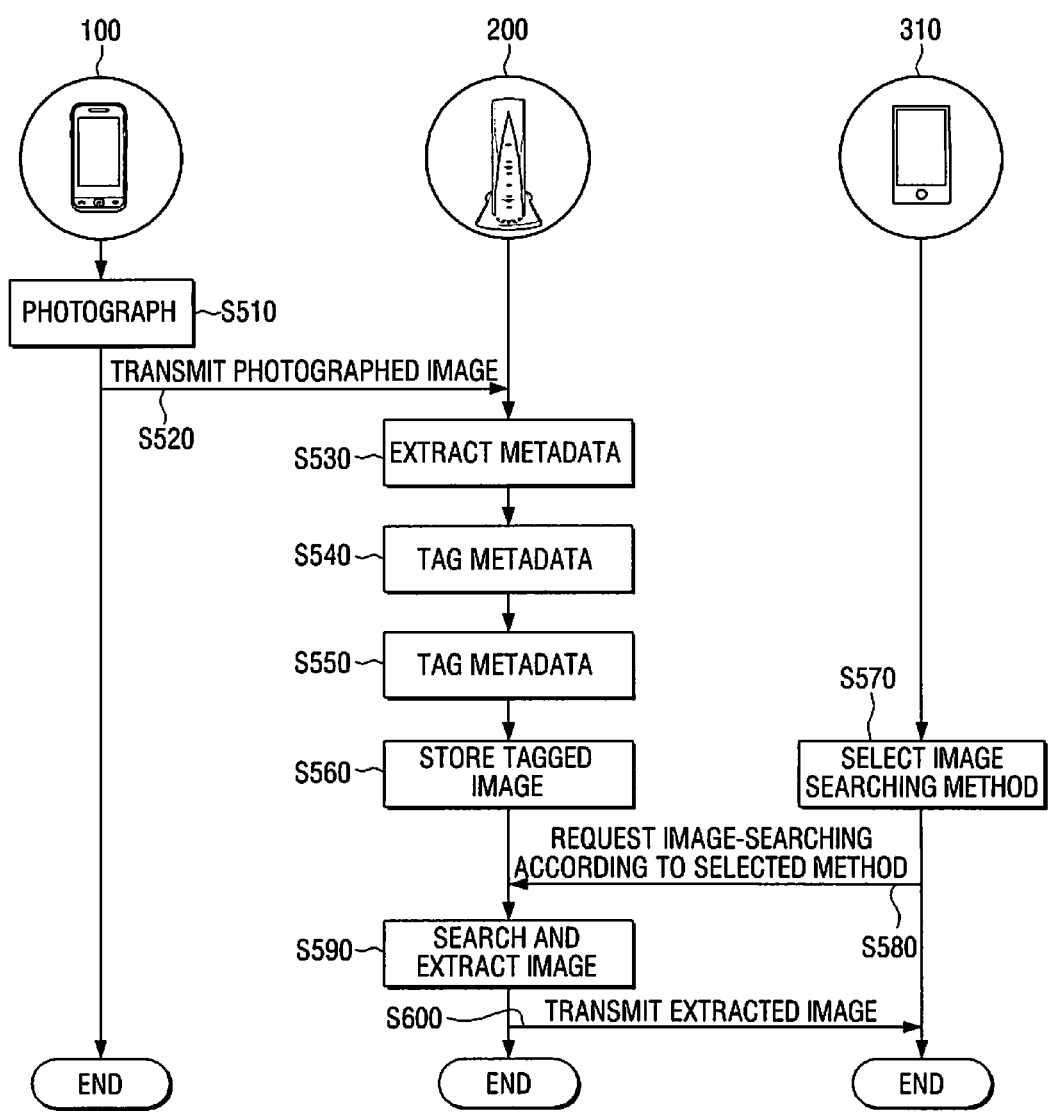
FIG. 3 illustrates a method for tagging metadata according to another embodiment of the present invention.

FIG. 3 illustrates a method for tagging metadata according to another embodiment of the present invention.

If the mobile phone 100 photographs a subject and generates an image in step S510, the mobile phone 100 transmits the generated image to the central storage apparatus 200 in step S520.

The central storage apparatus 200 analyzes the received image in step S530, extracts metadata of the analyzed image in step S540, and tags the extracted metadata to the received image in step S550. In addition, the central storage apparatus 200 stores the image to which metadata is tagged in step S560.

Meanwhile, the MP3P 310 receives an image searching method from a user to selectively receive a desired image from among the images tagged and stored in the central storage apparatus 200 in step S570.

If a user selects an image searching method, the MP3P 310 requests the central storage apparatus 200 to search an image according to the selected method in step S580, and the central storage apparatus 200 searches and extracts an image according to the requested searching method in step S590 and transmits the extracted images to the MP3P 310 in step S600.

As such, the image photographed through the mobile phone 100 is transmitted to the central storage apparatus 200, and the central storage apparatus 200 analyses the received image and tags metadata. Therefore, MP3P 310 may be able to use the photographed image by searching the photographed image from the mobile phone 100 more easily and conveniently.

Tagging Screen and Search Screen

Figure 4:
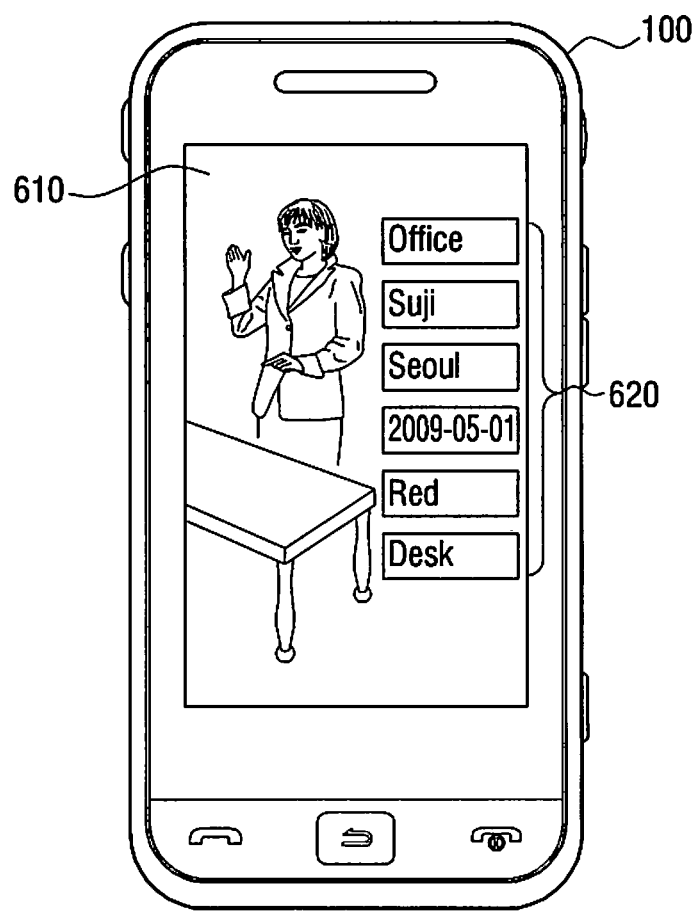
FIG. 4 illustrates an image with tagged metadata on a screen.

FIG. 4 illustrates an image with tagged metadata on a screen. In FIG. 4, it is assumed that metadata is tagged in the mobile phone 100 as in the embodiment of FIG. 2 for convenience of explanation.

Tagged metadata 620 are displayed on the screen along with a photographed image.

① First, referring to the photographed image 610, one person and a desk appear as subjects. The mobile phone 100 analyzes the image 610 and extracts 'Office', 'Suji', 'Red' and 'Desk' from the metadata.

Specifically, the mobile phone recognizes that 'Desk' is included in the image 610 using a configuration analysis algorithm, particularly by comparing the result of the configuration analysis of pre-stored images to which metadata of 'Desk' is tagged with the result of the configuration analysis of the photographed image 610.

In addition, the mobile phone 100 recognizes that the place of the photographed image 610 is 'Office' using the configuration analysis algorithm. In particular, if it is determined that some images to which metadata of 'Desk' is tagged from among pre-stored images are photographed in the same place as the photographed image 610 after comparing the result of the configuration analysis of some images to which metadata of 'Desk' is tagged from among pre-stored images with the result of the configuration analysis of the photographed image 610, 'Office' which is another metadata of the images to which the metadata of 'Desk' is tagged may be extracted as metadata of the photographed image 610.

Likewise, the mobile phone 100 may recognize that the person in the photographed image 610 is 'Suji' using the face recognition algorithm. In particular, if it is determined that the person in some images to which metadata of 'Suji' is tagged from among pre-stored images is the same person in the photographed image 610 after comparing the result of face recognition of some images to which metadata of 'Suji' is tagged from among pre-stored images with the result of face recognition of the photographed image 610, 'Suji' which is metadata of the images which photographed the same 'Suji' as in the photographed image 610 may be extracted as metadata of the photographed image 610.

In addition, if it is determined that 'Red' is a dominant color from among the colors of the photographed image 610 based on color analysis on the photographed image 610, the mobile phone 100 may extract 'Red' as metadata.

② Second, if a user photographs the image 610 through the mobile phone 100, the mobile phone 100 stores the date when the image 610 is photographed. Based on this information, the mobile phone 100 extracts the date/time when the image 610 is generated as metadata. In this embodiment, the date when the image 610 is photographed is 'May 1, 2009'.

③ Third, if a user photographs the image 610 using the mobile phone 100, the mobile phone 100 stores information regarding the location where the image 610 is photographed using a built-in GPS signal receiving tool. Based on this information, the mobile phone 100 extracts the location when the image 610 is generated as metadata. In this embodiment, the place where the image 610 is photographed is 'Seoul'.

In this embodiment, metadata such as 'Office', 'Suji', 'Seoul', '2009-05-01', 'Red' and 'Desk' is extracted using the face recognition algorithm, the configuration analysis algorithm, and the color analysis algorithm, but this is only an example. Metadata may be extracted in other ways.

④ As described above, metadata may be extracted based on what is input by a user.

Through the above process, metadata regarding a photographed image is stored together with the image in the central storage apparatus 200, and thus a user may search images more easily and conveniently using the stored metadata.

Hereinafter, a process of searching and displaying images will be explained with reference to FIGS. 5 to 7.

Figure 5:
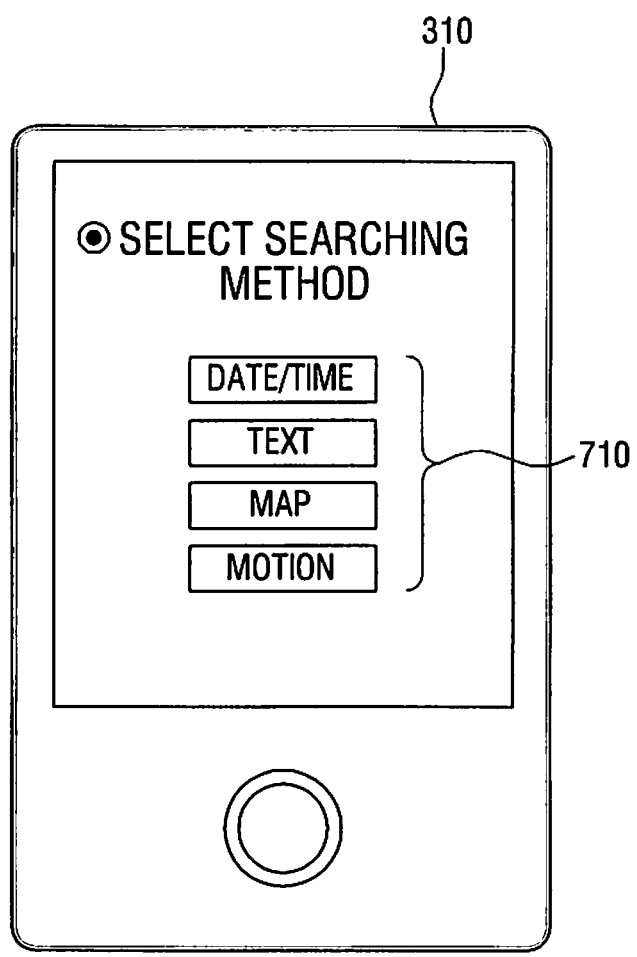
FIG. 5 illustrates a method for searching an image.

FIG. 5 illustrates a method for searching an image.

If a user inputs a command to search an image using the MP3P 310, the display of the MP3P 310 displays a screen for selecting a searching method. The screen displays ⓐ date/time search, ⓑ text search, ⓒ map search, and ⓓ motion search. The user may search images stored in the central storage apparatus 200 by selecting one method from among the search methods.

FIGS. 6A to 6E illustrate each of the searching methods on a screen.

Figure 6A:
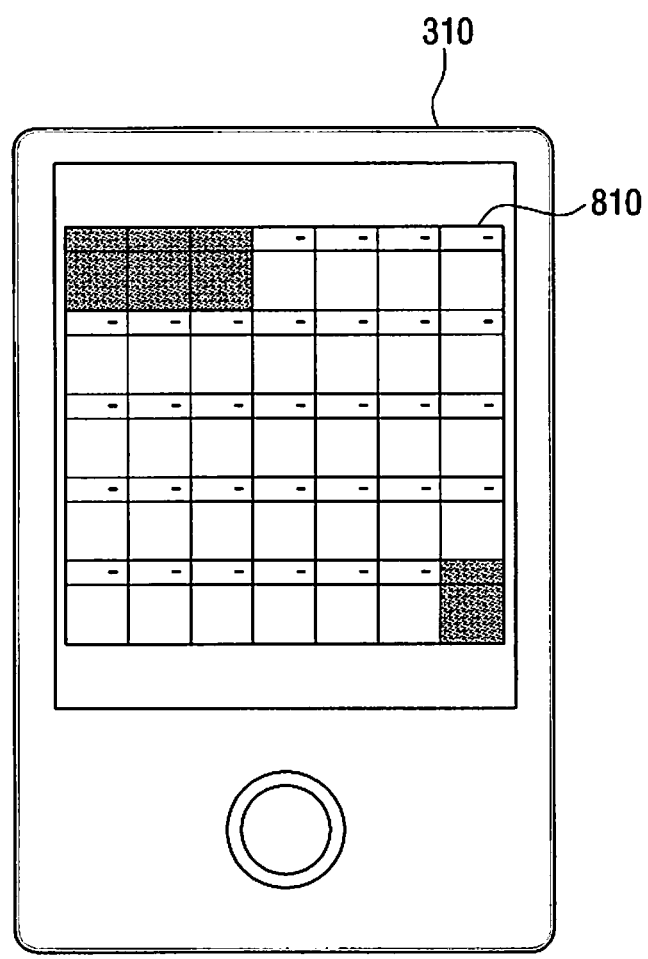
FIGS. 6A to 6E illustrate searching methods on a screen.

If a user selects ⓐ date/time search, a calendar screen is displayed on the MP3P 310 as illustrated in FIG. 6A.

Accordingly, the user may select a desired date on the calendar displayed on MP3P 310, and the MP3P 310 requests the central storage apparatus 200 to transmit images which have the selected data as metadata.

Subsequently, the MP3P 310 receives the search result on images having the selected date as metadata from the central storage apparatus 200. The search result may be the images themselves or separate information regarding the images.

The above embodiments are only examples, and the present invention is not limited to a searching method by selecting a date.

Figure 6B:
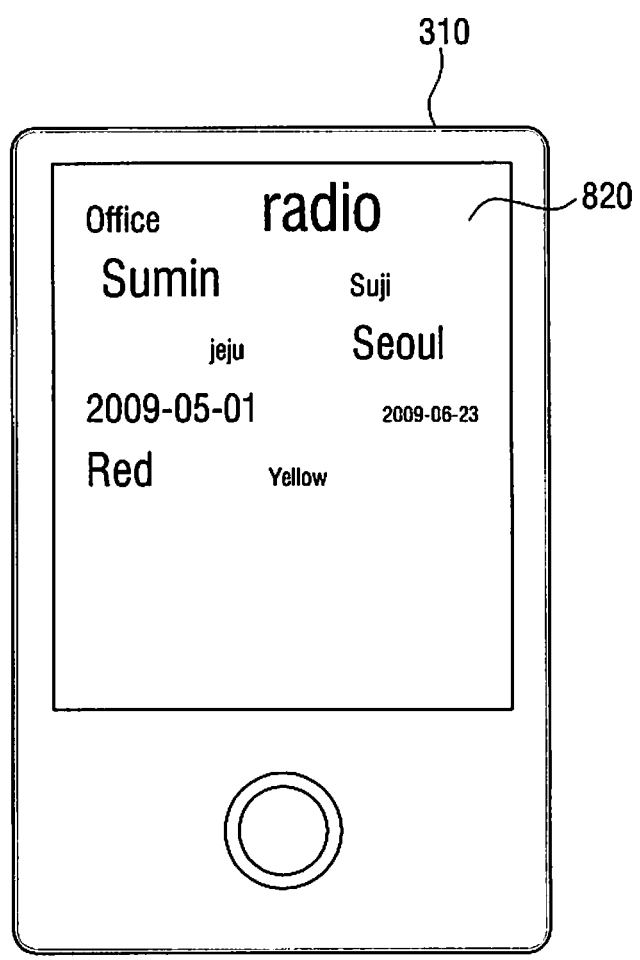

Meanwhile, if a user selects (b) text search, the display of the MP3P 310 displays various texts simultaneously as illustrated in FIG. 6B. The texts refer to metadata, and the texts may be displayed on the screen randomly or the size or location of the texts may be designated on the screen considering such aspects as importance and frequency.

Specifically, the MP3P 310 may display metadata with high frequency distinctively from other metadata. For example, the MP3P 310 may display metadata with the highest frequency in font, size and color which are different from other metadata. In addition, the MP3P may place metadata with the highest frequency on the highest place.

Likewise, the MP3P 310 may display metadata with the high priority set by a user distinctively from other metadata. For example, the MP3P 310 may display metadata with the highest priority in font, size and color which are different from other metadata. In addition, the MP3P may place metadata with the highest priority in the highest place. Accordingly, the user may select a desired text from among the texts of metadata displayed on the MP3P 310, and thus the MP3P 310 may request the central storage apparatus 200 to transmit images having the selected text as metadata according to the user's manipulation of selection of the text.

Subsequently, the MP3P 310 receives the search result on images having the selected text as metadata from the central storage apparatus 200. The search result may be the images themselves or separate information regarding the images.

The above embodiments are only examples, and the present invention is not limited to a searching method by selecting a text.

Figure 6C:
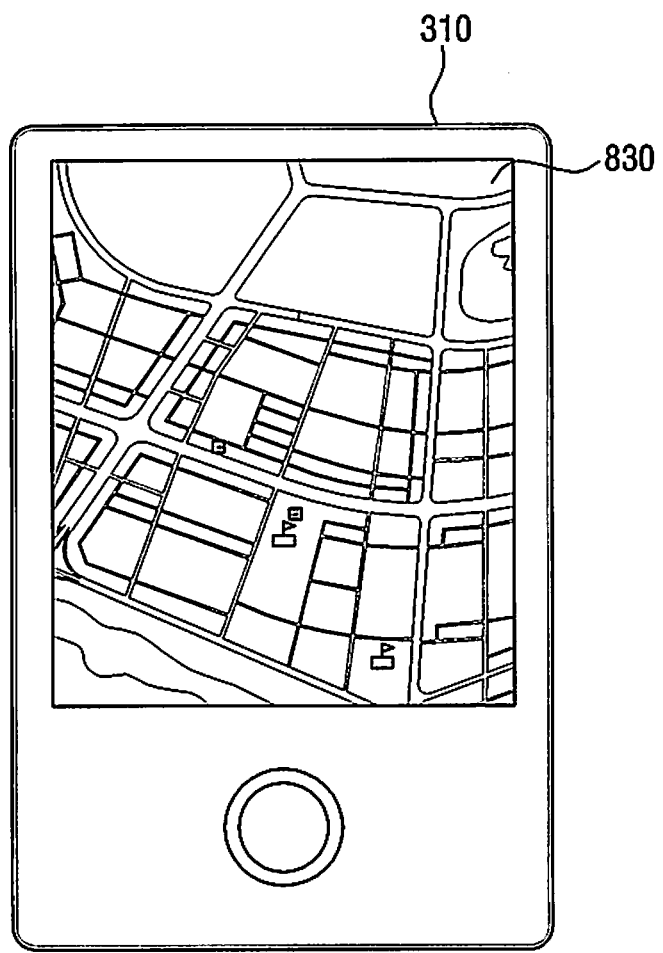

Meanwhile, if a user selects (c) map search, the display of the MP3P 310 displays a map 830 as illustrated in FIG. 6C.

Accordingly, the user may select a desired location (region) on the map displayed on the MP3P 310, and thus the MP3P 310 may request the central storage apparatus 200 to transmit images having the selected location (region) as metadata according to the user's manipulation of selecting the location.

Subsequently, the MP3P 310 receives the search result on images having the selected location (region) as metadata from the central storage apparatus 200. The search result may be the images themselves or separate information regarding the images.

The above embodiments are only examples, and the present invention is not limited to a searching method by selecting a location (region).

Figure 6D:
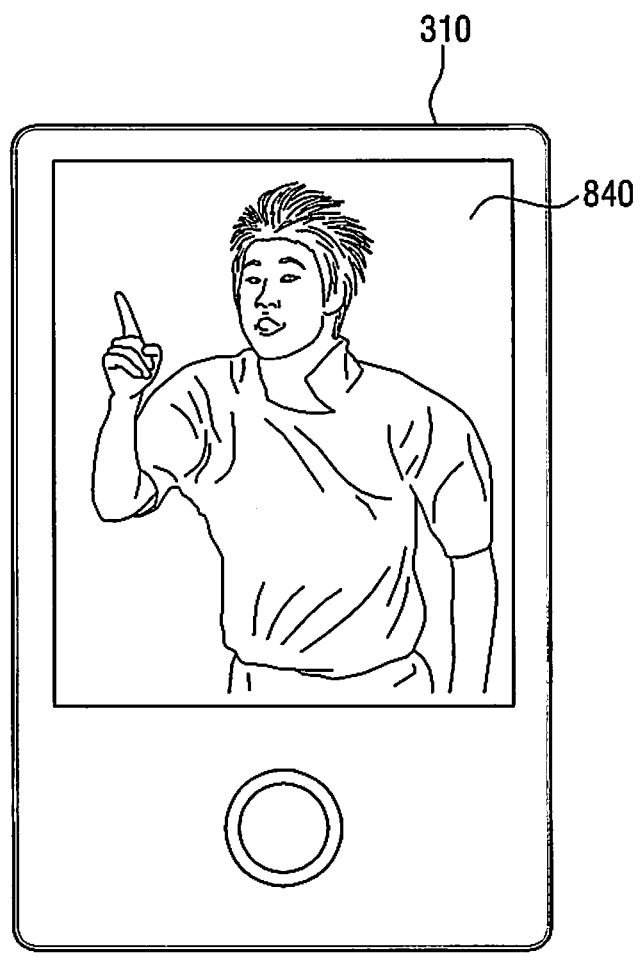

Meanwhile, if a user selects (d) motion search, the MP3P 310 initiates a photographing mode as illustrated in FIG. 6D.

Figure 6E:
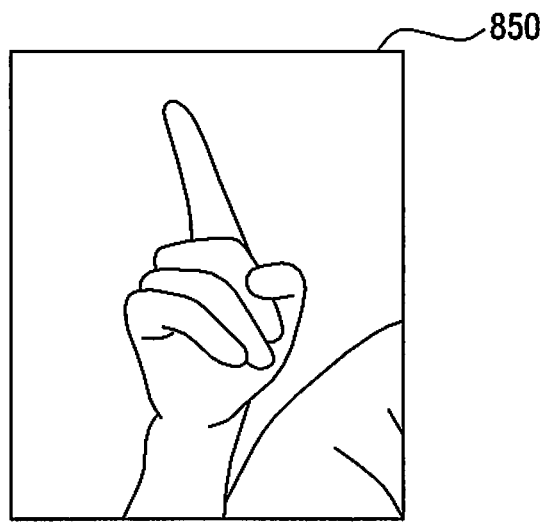

Accordingly, the user may photograph a subject 840 through the MP3P 310, and the MP3P 310 extracts a specific portion 850 from the photographed subject as illustrated in FIG. 6E. Thus, the MP3P 310 may request the central storage apparatus 200 to transmit images having the selected portion as metadata and images having the same image as the image of the specific portion.

Subsequently, the MP3P 310 receives the search result on images having the selected portion from the central storage apparatus 200. The search result may be the images themselves or separate information regarding the images.

The above embodiments are only examples, and the present invention is not limited to a searching method by selecting motion.

Figure 7:
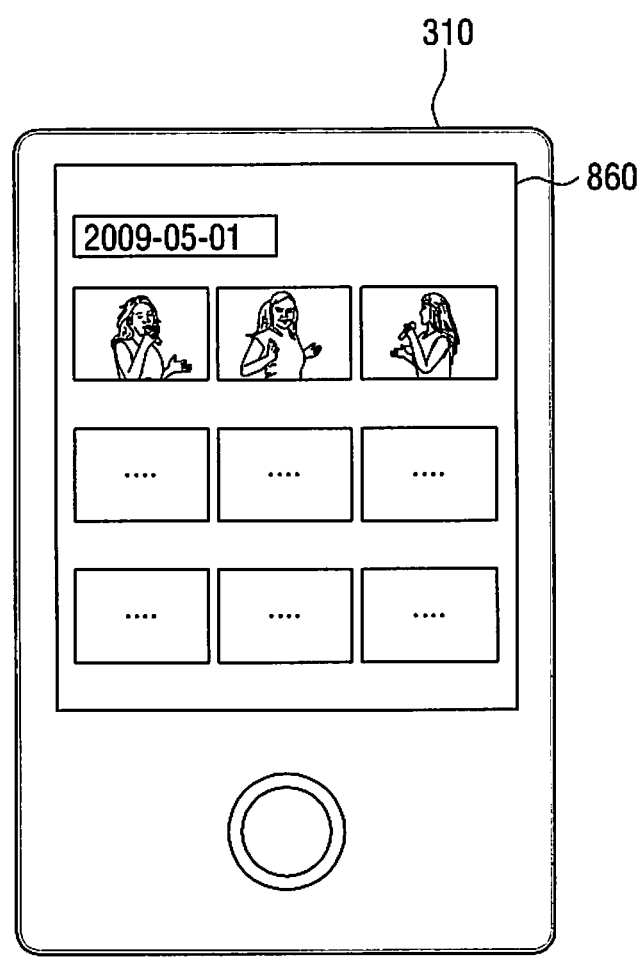
FIG. 7 illustrates images searched by a central storage apparatus that are transmitted to an MP3P and displayed on a screen of the MP3P.

FIG. 7 illustrates images searched by the central storage apparatus 200 that are transmitted to the MP3P 310 and displayed on a screen of the MP3P 310.

In particular, FIG. 7 illustrates that images 860 having metadata of 'May 1, 2009' are searched by the central storage apparatus 200 based on the date input to the MP3P 310 and displayed on the MP3P 310.

Accordingly, a user may search images stored in the central storage apparatus 200 more easily and conveniently by manipulating the MP3P 310 which is a different device from the central storage apparatus 200.

Configuration of Each Apparatus for Tagging Metadata

Figure 8:
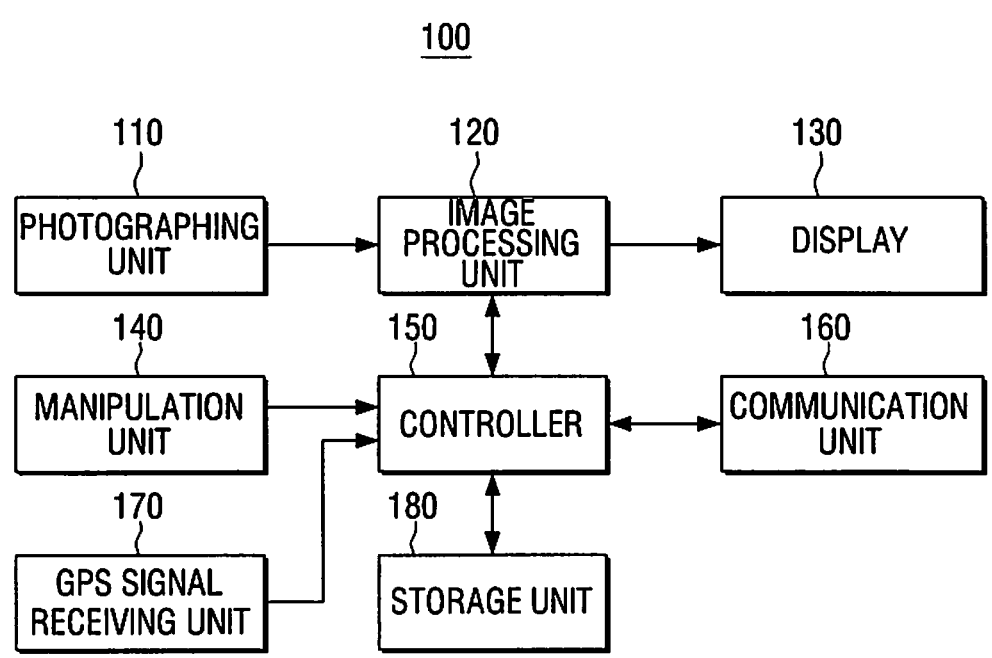
FIG. 8 is a schematic block diagram of a mobile phone.

FIG. 8 is a schematic block diagram of the mobile phone.

The mobile phone 100 comprises a photographing unit 110, an image processing unit 120, a display 130, a manipulation unit 140, a controller 150, a communication unit 160, a GPS signal receiving unit 170, and a storage unit 180.

The photographing unit 110 photographs a subject and transmits the photographed signal to the image processing unit 120.

The image processing unit 120 generates an image using the photographed image signal and transmits the generated image to the display 130. Accordingly, the display 130 displays the received image on a screen. In addition, the image processing unit 120 transmits the result of analyzing the generated image using the face recognition algorithm, the configuration analysis algorithm, and the color analysis algorithm to the controller 150.

Furthermore, the image processing unit 120 adds metadata received from the controller 150 to the generated image.

The manipulation unit 140 receives a user's manipulation command. Specifically, the manipulation unit 140 receives a user's manipulation regarding photographing a subject, image analysis, extracting and tagging metadata, and transmitting tagged metadata.

The manipulation unit 140 transmits a manipulation command input from a user to the controller 150.

The controller 150 controls the overall operation of the mobile phone 100. In particular, the controller 150 controls the image processing unit 120 to analyze images, extracts metadata of the images based on the analysis result performed by the image processing unit 120, and tags the extracted metadata to the images.

The communication unit 160 transmits the tagged images to the outside using a wireless communication method under the control of the controller 150.

The GPS signal receiving unit 170 receives information regarding the location of the mobile phone 100, for example from a satellite, and transmits the information to the controller 150. If an image is generated, the controller 150 extracts information regarding location as metadata of the generated image.

The storage unit 180 stores metadata, information regarding a generated image, information regarding location, information regarding image analysis, and programs necessary to perform the overall function of the mobile phone 100. The storage unit 180 may be realized as a hard disk or a non-volatile memory.

Since the configuration of peripheral apparatuses 310, 320, 330, 340 such as the MP3P 310 may be inferred from the configuration of the afore-mentioned mobile phone 100, further explanation will not be provided.

Figure 9:
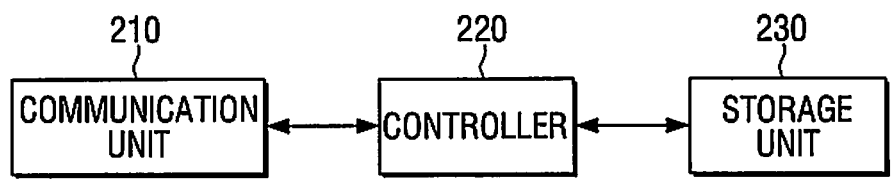
FIG. 9 is a schematic block diagram of a central storage apparatus.

FIG. 9 is a schematic block diagram of the central storage apparatus 200.

The central storage apparatus 200 comprises a communication unit 210, a controller 220, and a storage unit 230.

The communication unit 210 communicates with the mobile phone 100 and the peripheral apparatuses 310, 320, 330, 340 using a wireless communication method to transmit/receive images and to receive a request to search images.

In particular, the communication unit 210 receives tagged images from the mobile phone 100 and a request to search images from the peripheral apparatuses 310, 320, 330, 340, and transmits extracted images to the peripheral apparatuses 310, 320, 330, 340.

The controller 220 controls the overall operation of the central storage apparatus 200. In particular, the controller 220 controls to store images received from the mobile phone 100 in the storage unit 230 and searches images stored in the storage unit 230 according to a method selected by the peripheral apparatuses 310, 320, 330, 340.

The storage unit 230 stores tagged images, metadata, and programs necessary to perform the overall operation of the central storage apparatus 200. The storage unit 230 may be realized as a hard disk or a non-volatile memory.

In the above embodiment, the mobile phone 100 is presented as an apparatus to generate an image, but this is only an example. The technical feature of the present invention may also applied when not only the afore-mentioned peripheral apparatuses 310, 320, 330, 340 but also other apparatuses are used as the apparatus to generate an image.

In addition, a method of generating an image is not limited to generating an image by photographing a subject. The technical feature of the present invention may also be applied when an image is generated using other methods such as downloading an image through a network.

Furthermore, the technical feature of the present invention is not limited to an image. If an audio or a text is generated, for example, metadata may also be tagged to the generated audio or text.

The afore-mentioned metadata generating method and searching method are only examples. The technical feature of the present invention may also be applied when other methods are used.

Metadata with Tagged Gesture

The mobile phone 100 may also tag a user's gesture to metadata. Referring to FIG. 8, the manipulation unit 140 of the mobile phone 100 receives a user's gesture which corresponds to a user's touch. Herein, the gesture represents certain shape of touch input by the user. The gesture is consisted of information regarding the shape of a single touch input from a user. Accordingly, the controller 150 of the mobile phone 100 determines whether one gesture is the same as another gesture based on the shape of touch, regardless of the location of the touch manipulation.

The controller 150 tags the input gesture to metadata of specific contents by matching the input gesture to one of information included in the metadata of the specific contents.

If the gesture is input through the manipulation unit 140 while the gesture is tagged to metadata of specific contents, the controller 150 executes the specific contents.

The above operation will be explained in detail with reference to FIGS. 10A to 12E, in which the premise is that the manipulation unit 140 of the mobile phone 100 can receive a user's touch manipulation including an input through a touch screen.

FIGS. 10A to 10F are views illustrating a process of tagging a user's gesture to metadata of music contents using the mobile phone 100 according to an embodiment of the present invention. Herein, the gesture represents a certain shape of touch input by the user. The gesture consists of information regarding the shape of a single touch input from a user. Accordingly, the mobile phone 100 determines whether one gesture is the same as another gesture based on the shape of touch, regardless of the location of the touch manipulation.

Figure 10A:
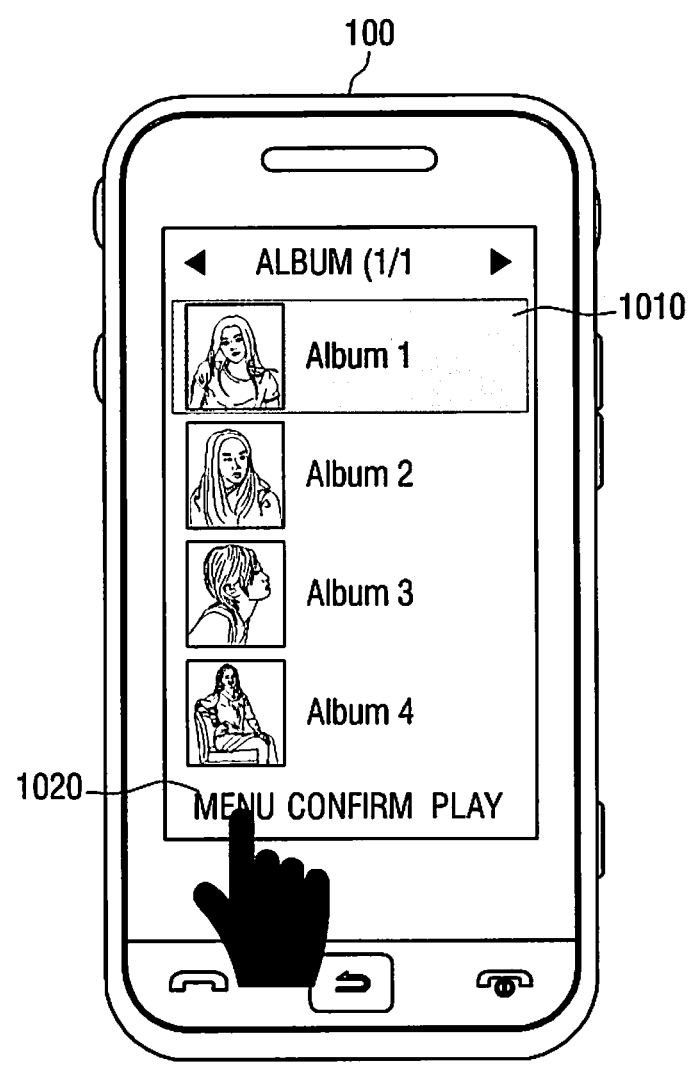
FIGS. 10A to 10F illustrate a process of tagging a user's gesture to metadata of music contents using a mobile phone according to an embodiment of the present invention.

FIG. 10A illustrates the mobile phone 100 in which an album list is displayed on the screen. As illustrated in FIG. 10A, 'Album 1' is highlighted (1010) in the album list displayed on the mobile phone 100. In this case, if a user touches a menu 1020, the mobile phone 100 displays a menu 1030, which shows functions related to 'Album 1' on the screen as illustrated in FIG. 10B.

Figure 10B:
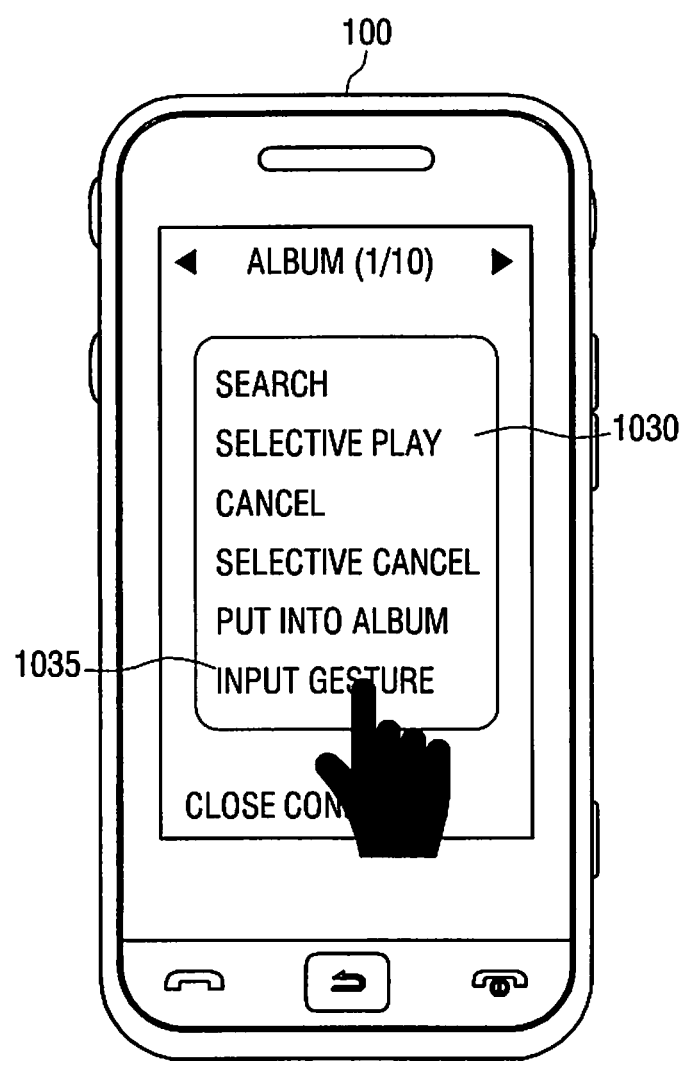

FIG. 10B illustrates the mobile phone 100 in which the menu 1030 showing functions related to 'Album 1' is displayed on the screen. As illustrated in FIG. 10B, the menu 1030 includes search, selective play, cancel, selective cancel, put into album, and input gesture 1035. Herein, if input gesture 1035 is selected by a user, the mobile phone 100 displays a gesture input window 1040 on the screen as illustrated in FIG. 10C.

Figure 10C:
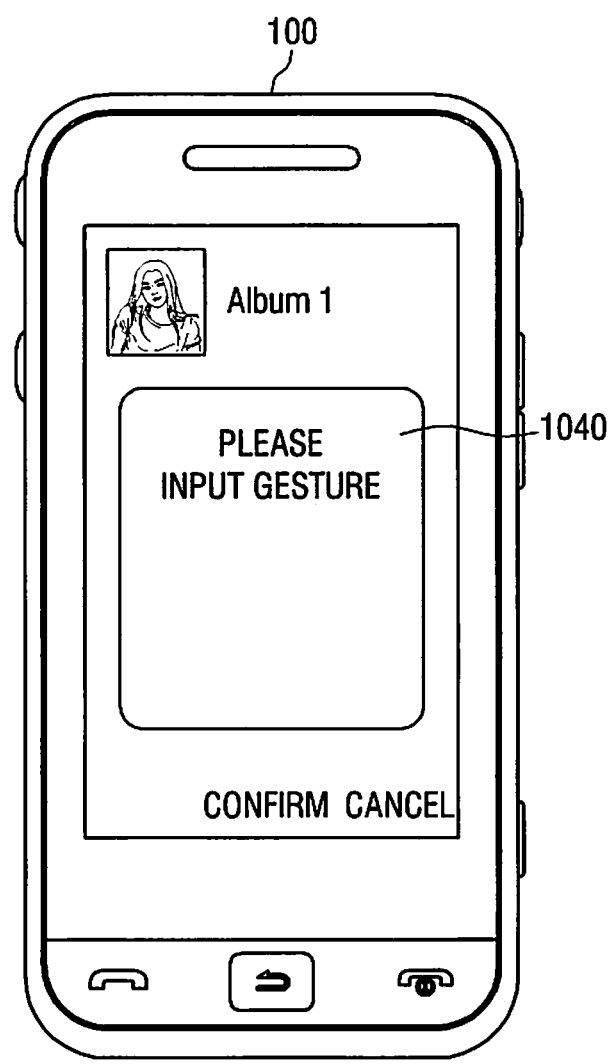

FIG. 10C illustrates the mobile phone 100 in which the gesture input window 1040 to receive a gesture regarding 'Album 1' is displayed. The mobile phone 100 recognizes touch manipulation input through the gesture input window 1040 as a gesture.

Figure 10D:
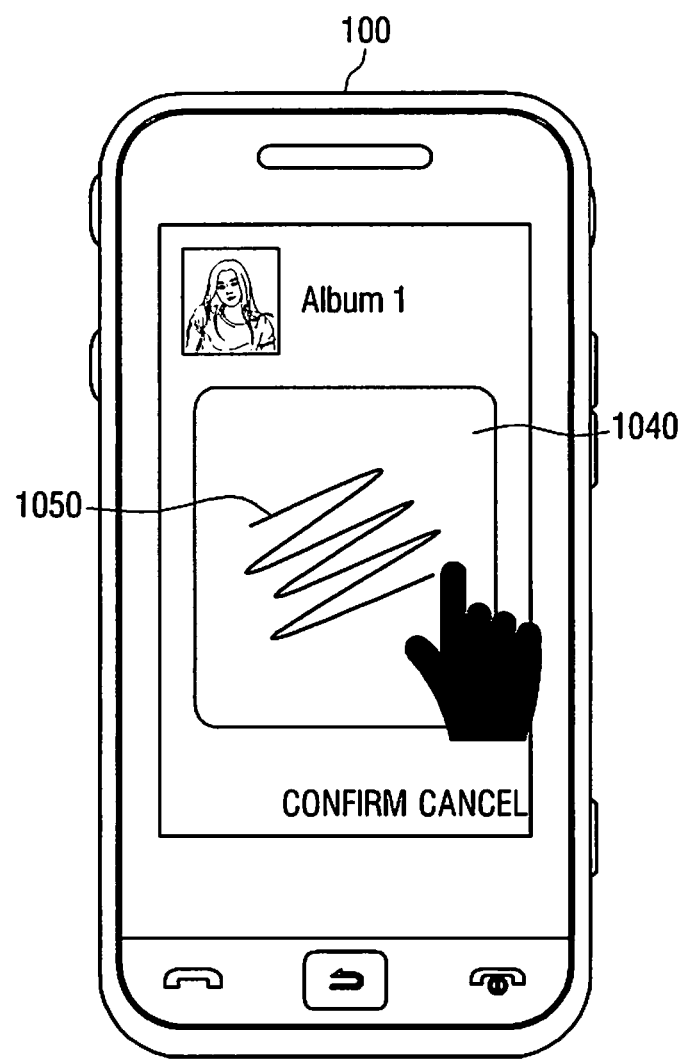

FIG. 10D illustrates gesture 1 (1050) which is a gesture regarding 'Album 1' and which is input through the gesture input window 1040 by a user. As illustrated in FIG. 10D, if the gesture 1 (1050) is input through the gesture input window 1040 by a user, the mobile phone 100 recognizes and stores the shape of touch created by the input gesture 1 (1050).

Figure 10E:
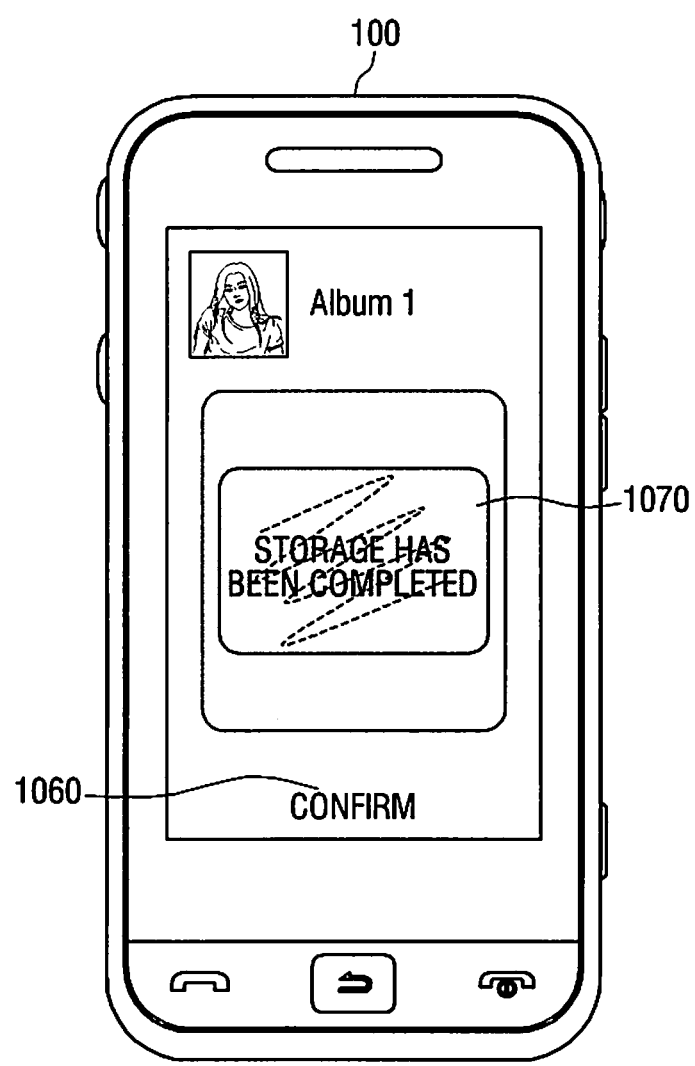

FIG. 10E illustrates the mobile phone 100 in which a message 1070 informing that storing of the gesture is completed is displayed on the screen. If the gesture 1 (1050) is input and a confirm icon 1060 is selected by a user, the mobile phone 100 stores the shape of the input gesture 1 (1050) and tags the gesture 1 (1050) to album information of metadata of contents by matching the gesture 1 (1050) to 'Album 1'. In this case, the mobile phone 100 tags the gesture 1 (1050) to album information of metadata of all contents whose album information of metadata is 'Album 1' from among stored contents.

Figure 10F:
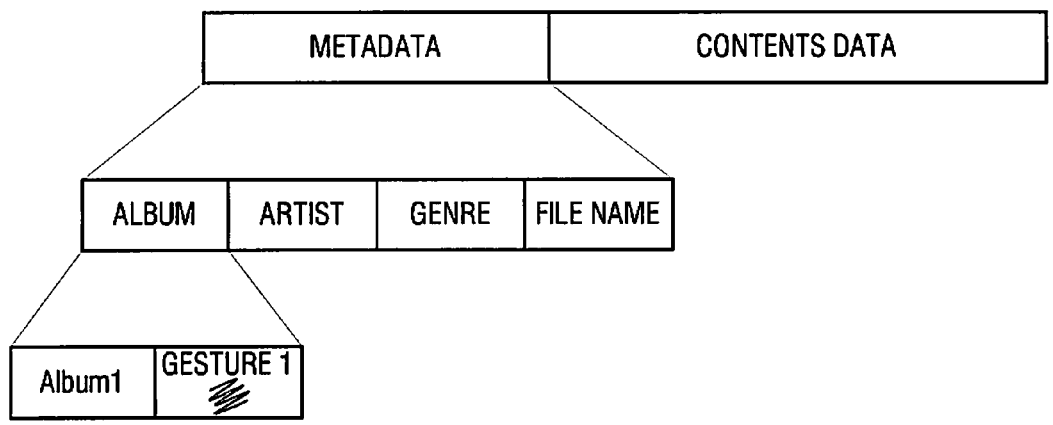

FIG. 10F illustrates the structure of a contents file in which a gesture is tagged to album information of metadata. As illustrated in FIG. 10F, the contents file includes metadata and contents data. The metadata includes information regarding album, artist, genre, and file name. In addition, it can be seen that 'Album 1' is tagged as album information, and the gesture 1 is also tagged to 'Album 1'. As such, the mobile phone 100 tags the gesture to metadata of contents by matching the gesture to one of the information included in metadata.

Through the above process, the mobile phone 100 may tag a gesture to metadata.

Hereinafter, a method for executing contents using the gesture will be explained with reference to FIGS. 11A to 11C.

Figure 11A:
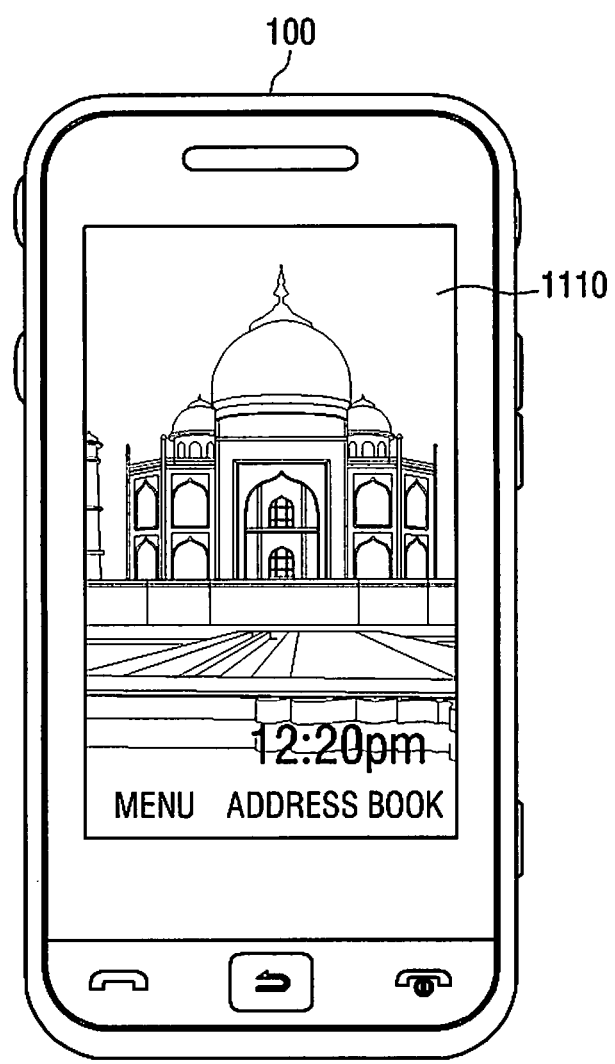
FIGS. 11A to 11C illustrate a process of executing contents using a gesture according to an embodiment of the present invention.

FIG. 11A illustrates the mobile phone 100 in which a background screen 1110 is displayed. In this case, if a gesture 1120 is input by a user, the mobile phone 100 recognizes the shape of the input gesture 1120.

Figure 11B:
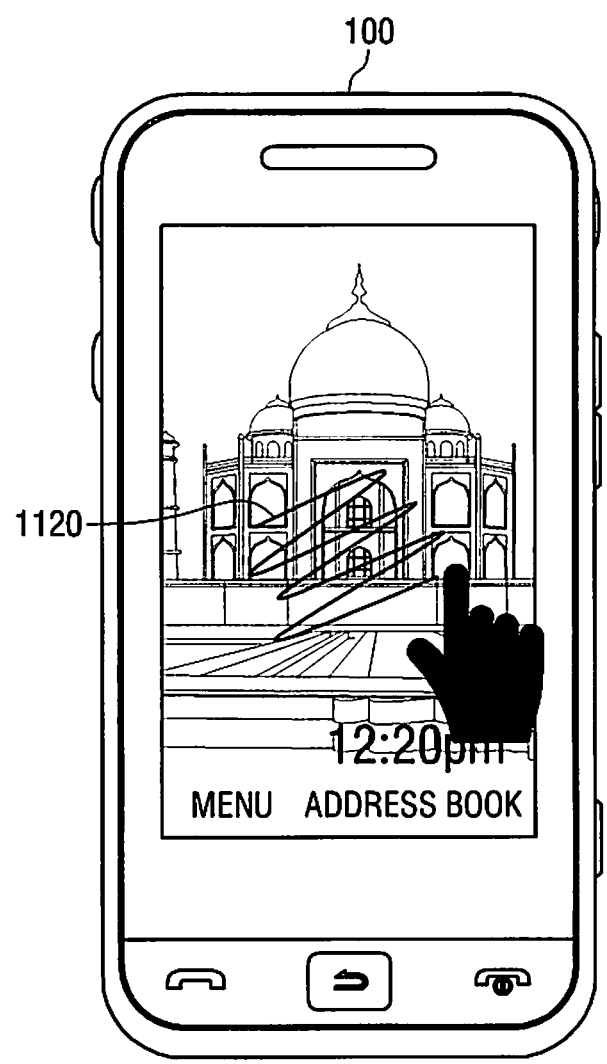

It can be seen that the gesture 1120 input in FIG. 11B is the same as the gesture 1 (1050) input in FIG. 10D. Accordingly, the mobile phone 100 executes contents corresponding to 'Album 1'.

Figure 11C:
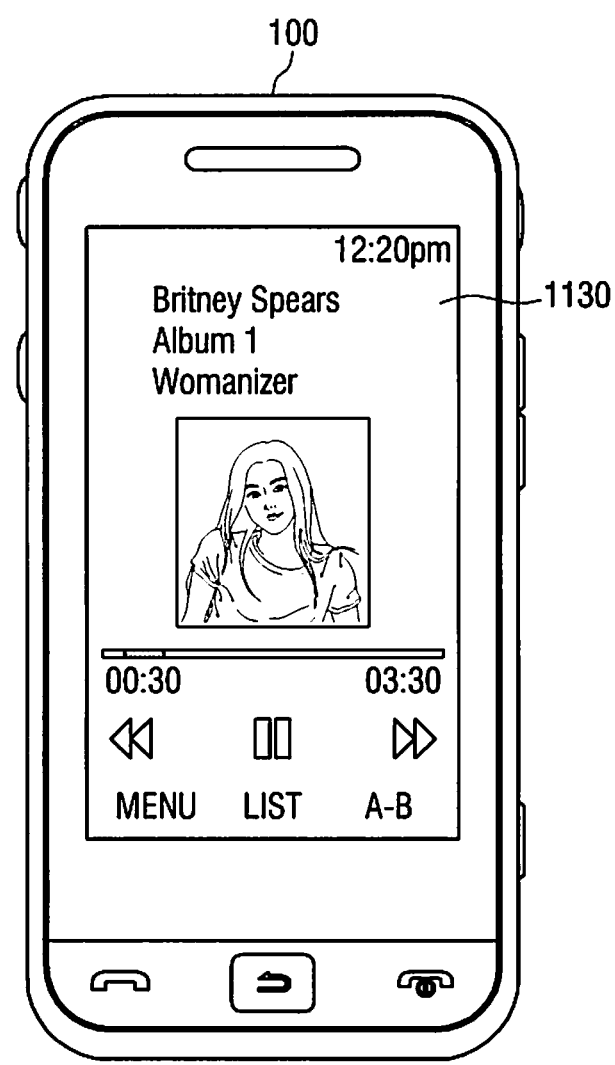

FIG. 11C illustrates a screen in which the mobile phone 100 reproduces first contents of 'Album 1'. As illustrated in FIG. 11C, if gesture 1120 is input, the mobile phone 100 selects contents regarding 'Album 1' as a playlist and automatically reproduces a first music selection of 'Album 1'.

As such, if a gesture is input, the mobile phone 100 searches gestures tagged to metadata of contents, selects contents to which the same gesture is tagged as metadata, and automatically executes the selected contents.

Accordingly, a user may execute desired contents easily by simply inputting gesture.

Hereinafter, a process of changing gestures will be explained with reference to FIGS. 12A to 12E, which illustrate a process of changing a gesture tagged to metadata of music contents using the mobile phone 100.

Figure 12A:
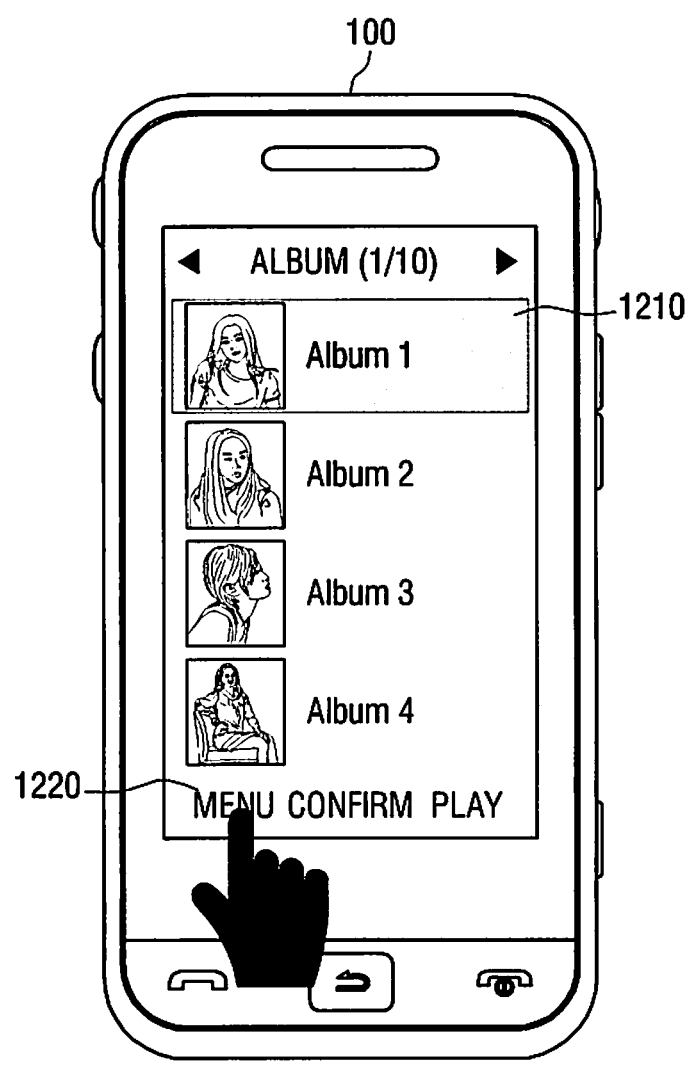

FIG. 12A illustrates the mobile phone where an album list is displayed on the screen. As illustrated in FIG. 12A, 'Album 1' is highlighted (1210) in the album list displayed on the mobile phone 100. In this case, if a user touches a menu 1220, the mobile phone 100 displays a menu 1230, which shows functions related to 'Album 1' on the screen as illustrated in FIG. 12B.

Figure 12B:
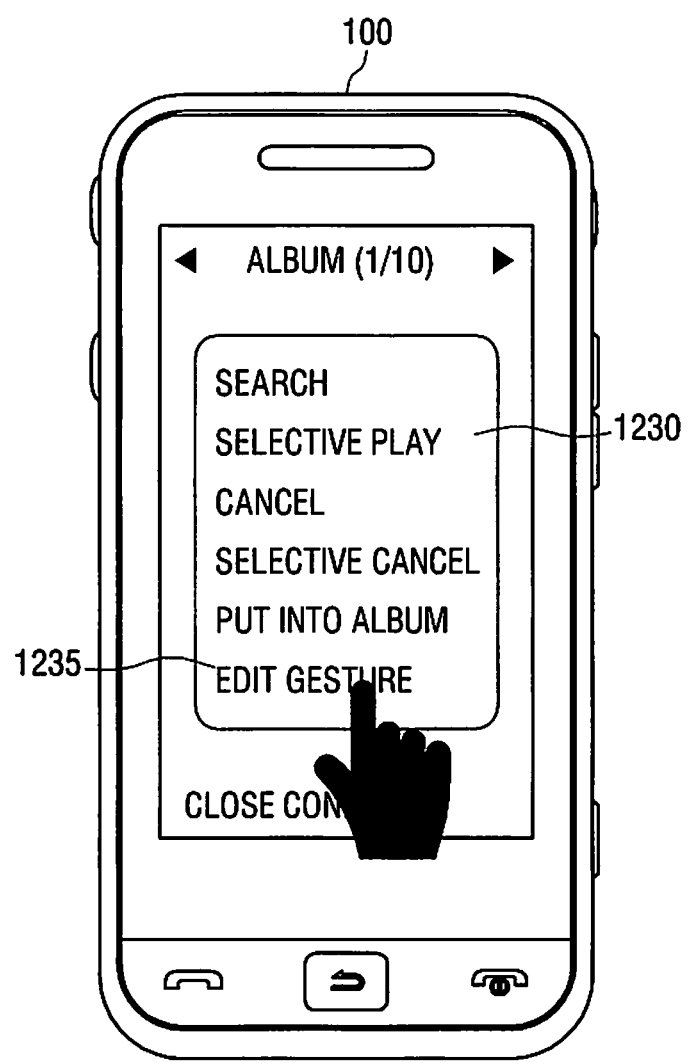

FIG. 12B illustrates the mobile phone 100 in which the menu 1230 showing functions related to 'Album 1' is displayed on the screen. As illustrated in FIG. 12B, the menu 1230 includes search, selective play, cancel, selective cancel, put into album, and edit gesture 1235. Herein, if edit gesture 1235 is selected by a user, the mobile phone 100 displays a gesture input window 1240 on the screen as illustrated in FIG. 12C.

FIG. 12C illustrates the mobile phone 100 in which the gesture input window 1240 to receive a gesture regarding 'Album 1' is displayed. The mobile phone 100 recognizes touch manipulation input through the gesture input window 1240 as a gesture.

Figure 12D:
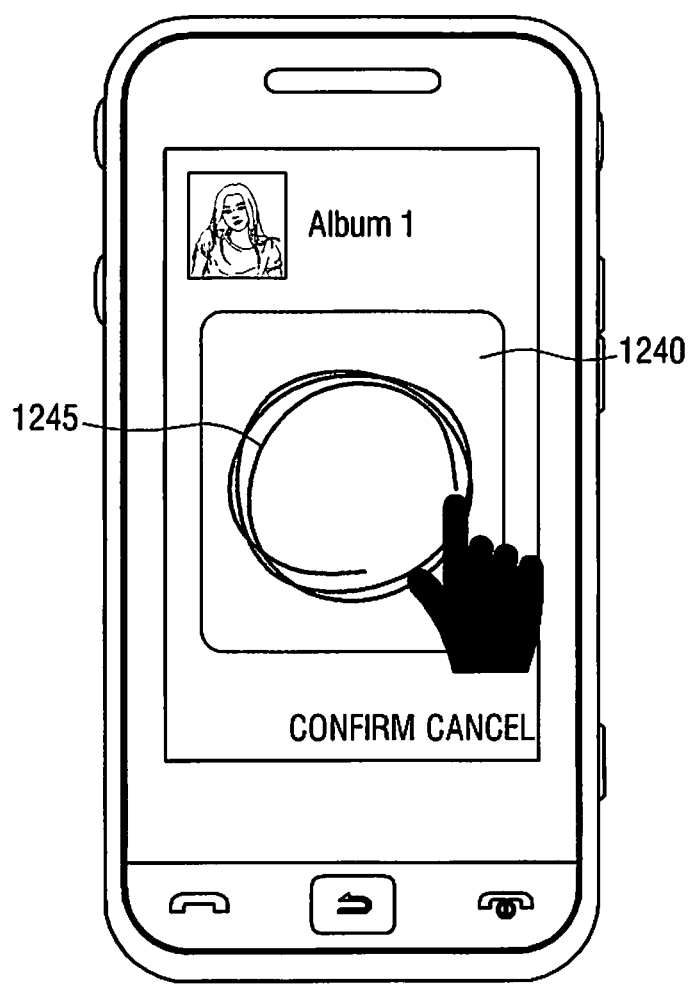

FIG. 12D illustrates that gesture 2 (1245) which is a gesture regarding 'Album 1' is input through the gesture input window 1240 by a user. As illustrated in FIG. 12D, if the gesture 2 (1245) is input through the gesture input window 1240 by a user, the mobile phone 100 changes the gesture tagged to 'Album 1' from the gesture 1 (1050) to the gesture 2 (1245).

Figure 12E:
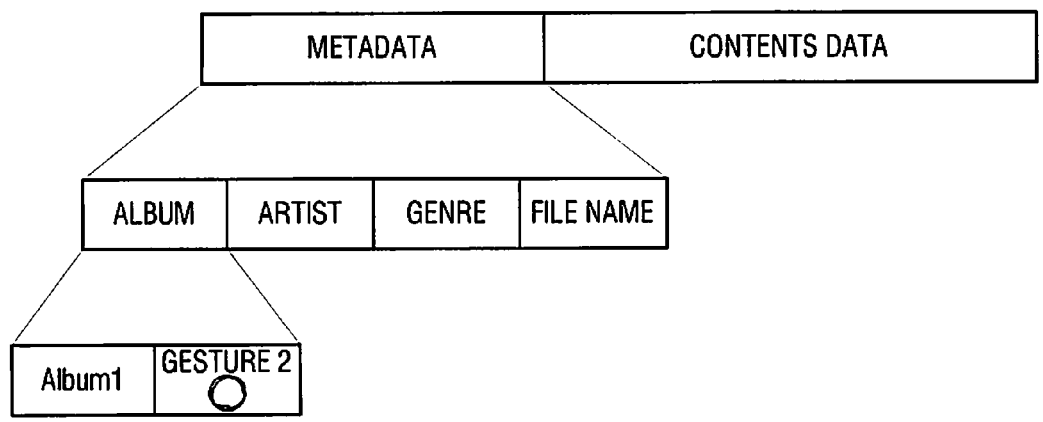

FIG. 12E illustrates that the gesture tagged to album information of metadata is changed to the gesture 2 (1245). As illustrated in FIG. 12E, it can be seen that the gesture 2 is tagged along with "Album 1'. As such, the mobile phone 100 may change the gesture tagged to metadata.

As described above, the mobile phone 100 tags a gesture to metadata, and thus contents may be searched and reproduced using the gesture tagged to metadata.

In the above embodiments, contents are set to be music contents, but this is only an example. Contents may also be image contents, video contents, or document contents.

In addition, in the above embodiments, the gesture is set to correspond to one of information in metadata, but this is only an example. The gesture may be one of information constituting metadata. For example, metadata may include information regarding album, artist, genre, file name, and gesture.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A user terminal apparatus, comprising:
   a storage which stores a content generated by the user terminal apparatus;
   a touch screen which receives a first touch gesture; and
   a controller which controls to tag the first touch gesture to metadata of the content, and in response to receiving the first touch gesture, searches for the content to which the metadata is tagged to the first touch gesture,
   wherein the controller changes the first touch gesture to a second touch gesture according to a user input, and in response to receiving the second touch gesture, searches for content to which metadata is tagged to the second touch gesture, and
   wherein the first and second touch gesture are identified based on a shape of a touch gesture.

2. The user terminal apparatus of claim 1, wherein, in response to the second touch gesture being input after the second touch gesture is tagged to the metadata, the controller controls to search for the content based on the second touch gesture.

3. A user terminal apparatus, comprising:
   a storage which stores a content generated by the user terminal apparatus;
   a touch screen which receives a first touch gesture; and
   a controller which controls to tag the first touch gesture to metadata of the content, in response to receiving the first touch gesture, search for the content to which the metadata is tagged to the first touch gesture, and display the searched content on the touch screen,
   wherein, the controller changes the first touch gesture to a second touch gesture according to a user input, and in response to receiving the second touch gesture, searches for content to which metadata is tagged to the second touch gesture.

4. The user terminal apparatus of claim 1, wherein the tagged metadata of the content is stored along with the first and the second touch gesture, and
   wherein information corresponding to the shape of the touch gesture is stored within the tagged metadata of the content.

5. The user terminal apparatus of claim 2, wherein the controller searches for content having metadata including information indicating a shape corresponding to the shape of the second touch gesture on the touch screen.

6. The user terminal apparatus of claim 3, wherein the controller searches for content having metadata including information indicating a shape corresponding to the shape of the second touch gesture on the touch screen.

* * * * *